(12) United States Patent
Chen

(10) Patent No.: US 7,174,971 B1
(45) Date of Patent: Feb. 13, 2007

(54) CLOCKWISE OR COUNTERCLOCKWISE ROTATION CONTROL DEVICE OF A PNEUMATIC TOOL

(75) Inventor: Lung-Pao Chen, Hsinchu County (TW)

(73) Assignee: Sunmatch Industrial Co., Ltd., Zhubei (TW)

( * ) Notice: Subject to any disclaimer, the term of this patent is extended or adjusted under 35 U.S.C. 154(b) by 0 days.

(21) Appl. No.: 11/319,520

(22) Filed: Dec. 29, 2005

(51) Int. Cl.
*B23B 45/04* (2006.01)

(52) U.S. Cl. ............... 173/104; 173/93; 173/93.5; 173/168; 173/169

(58) Field of Classification Search ........... 173/104, 173/93, 93.5, 93.6, 169, 168, 213, 221
See application file for complete search history.

(56) References Cited

U.S. PATENT DOCUMENTS

| | | | | |
|---|---|---|---|---|
| 3,951,217 | A * | 4/1976 | Wallace et al. | 173/169 |
| 4,462,282 | A * | 7/1984 | Biek | 81/57.11 |
| 5,346,024 | A * | 9/1994 | Geiger et al. | 173/221 |
| 5,377,769 | A * | 1/1995 | Hasuo et al. | 173/169 |
| 6,622,802 | B2 * | 9/2003 | Hezeltine | 173/1 |
| 6,883,617 | B2 * | 4/2005 | Putney et al. | 173/1 |
| 6,883,619 | B1 * | 4/2005 | Huang | 173/93.5 |
| 6,902,011 | B2 * | 6/2005 | Hall | 173/169 |

FOREIGN PATENT DOCUMENTS

TW 569885 1/2004

* cited by examiner

*Primary Examiner*—Scott A. Smith
(74) *Attorney, Agent, or Firm*—Birch, Stewart, Kolasch, and Birch, LLP

(57) ABSTRACT

The present invention discloses a clockwise or counterclockwise rotation control device installed to a pneumatic tool uses pressurized air as power. The pneumatic tool comprises a main body of the pneumatic motor module, a rear cover module disposed at a rear end of the main body and having an air guide base, and a containing space disposed inside the air guide base for installing a control valve. The control valve includes a valve passage and two airflow passages interconnected to the pneumatic motor module and the containing space to produce two opposite rotating directions. The direction of the valve passage can be adjusted by changing the control valve, so that pressurized air enters into one of the airflow passages to constitute a clockwise or counterclockwise rotating state of the pneumatic motor module. The pressurized air is controlled to enter directly from the air guide base into the pneumatic motor module.

4 Claims, 5 Drawing Sheets

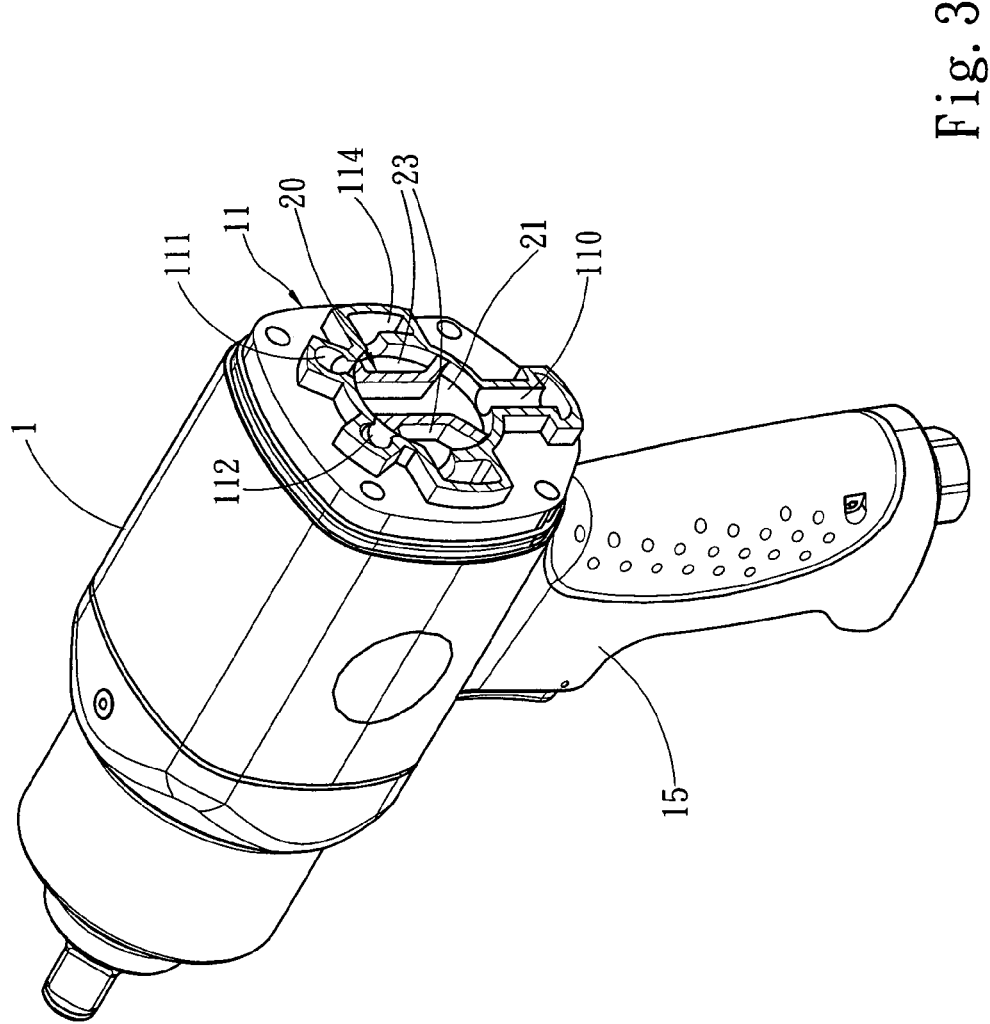

CLOCKWISE OR COUNTERCLOCKWISE ROTATION CONTROL DEVICE OF A PNEUMATIC TOOL

FIELD OF THE INVENTION

The present invention relates to a pneumatic tool, and more particularly to a pneumatic tool having a clockwise or counterclockwise rotation control device.

BACKGROUND OF THE INVENTION

In general, the power of a pneumatic tool comes from a pressurized air that drives a pneumatic motor module of the pneumatic tool for the use of the pneumatic tool, wherein the pneumatic motor module controls and guides the flowing direction of the pressurized air to produce a clockwise or counterclockwise rotating state for the pneumatic tool. For example, an improved airflow control mechanism disclosed in R.O.C. Pat. Publication 569885 comprises: a cylinder having a cylindrical cylinder body; an air chamber disposed in the cylinder body, two directional air holes individually penetrating a corresponding wall at an end of a shaft of the cylinder body for connecting the air chamber with the external side of the cylinder body; an air valve having a circular body with its axial distal surface coupled to an axial distal surface of the cylinder body; two extending air holes separately extended in a predetermined direction from the cylinder body; two distal holes separately disposed at an axial distal surface of the cylinder body and on the internal circular surface of the cylinder body, and the two extending air holes are interconnected to the two directional air holes respectively; an adjusting member having a disc-shape base with a predetermined thickness and coaxially contained in the cylinder body and pivotally rotated in a clockwise position or a counterclockwise position, and the distal surfaces are connected to the internal circular surface; an air passage extended along the radial direction of the base; and an air outlet being an open end of the air passage disposed at a predetermined position of the distal surface of the base for interconnecting the air passage and a corresponding extending air hole.

From the description above, the pressurized air passes through the airflow passage of the adjusting member and enters into the clockwise air hole from the extending air hole of the air valve. It is worth to point out that the pressurized air has an air pressure greater than the atmospheric pressure, and thus the pressurized air is normally equalized with a position having a lower pressure in the environment. Airflow will be produced to form a fluid dynamical force, and the pneumatic tool uses such principle and the fluid dynamical force to drive the motor module. However, such patented technology has a problem that requires an air valve to be connected between the clockwise air hole and the air passage for adjusting and transmitting the pressurized air, and the high pressure of the pressurized air may leak from the gap between components gradually, so that the motor cannot maintain its expected horsepower, and thus lowering the efficiency of the pneumatic tool.

Effectively transmitting the pressurized air to the pneumatic tool and reducing the improper pressure leak to improve the efficiency of the pneumatic tool are the subjects for developers in the related field. This invention discloses a novel design of a pneumatic tool capable of minimizing the chance of an improper pressure leak of the pneumatic tool.

SUMMARY OF THE INVENTION

The primary objective of the present invention is to overcome the foregoing shortcomings and avoid the existing deficiency by providing a clockwise or counterclockwise rotation control device of a pneumatic tool, and the clockwise counterclockwise rotation control device is installed onto a main body of the pneumatic tool. The main body installs a rear cover module having an air guide base for installing a control valve, and the air guide base includes two clockwise or counterclockwise airflow passages that define a clockwise or counterclockwise rotating state for a pneumatic motor module of the pneumatic tool respectively, so that the pressurized air that drives the motor module passes through the airflow passage of the control valve to drive the motor module directly in the clockwise or counterclockwise airflow passage, and the pneumatic tool produces a clockwise or counterclockwise rotation. In the above process, the pressurized air enters from the control valve directly into the clockwise counterclockwise airflow passage without requiring the installation of complicated component modules, so as to minimize the loss of pressurized air.

BRIEF DESCRIPTION OF THE DRAWINGS

FIG. 3 is a cross-sectional view of the present invention; and

DETAILED DESCRIPTION OF THE PREFERRED EMBODIMENTS

Figure 1:
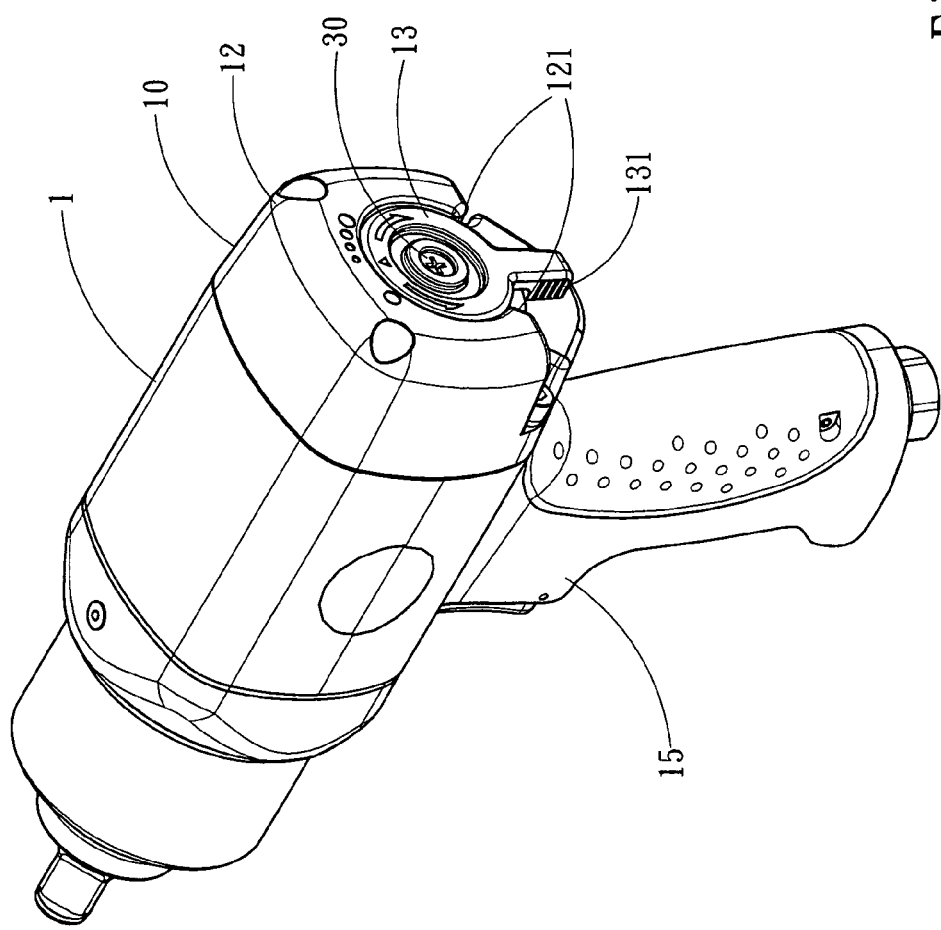
FIG. 1 is a perspective view of the present invention.
Figure 2:
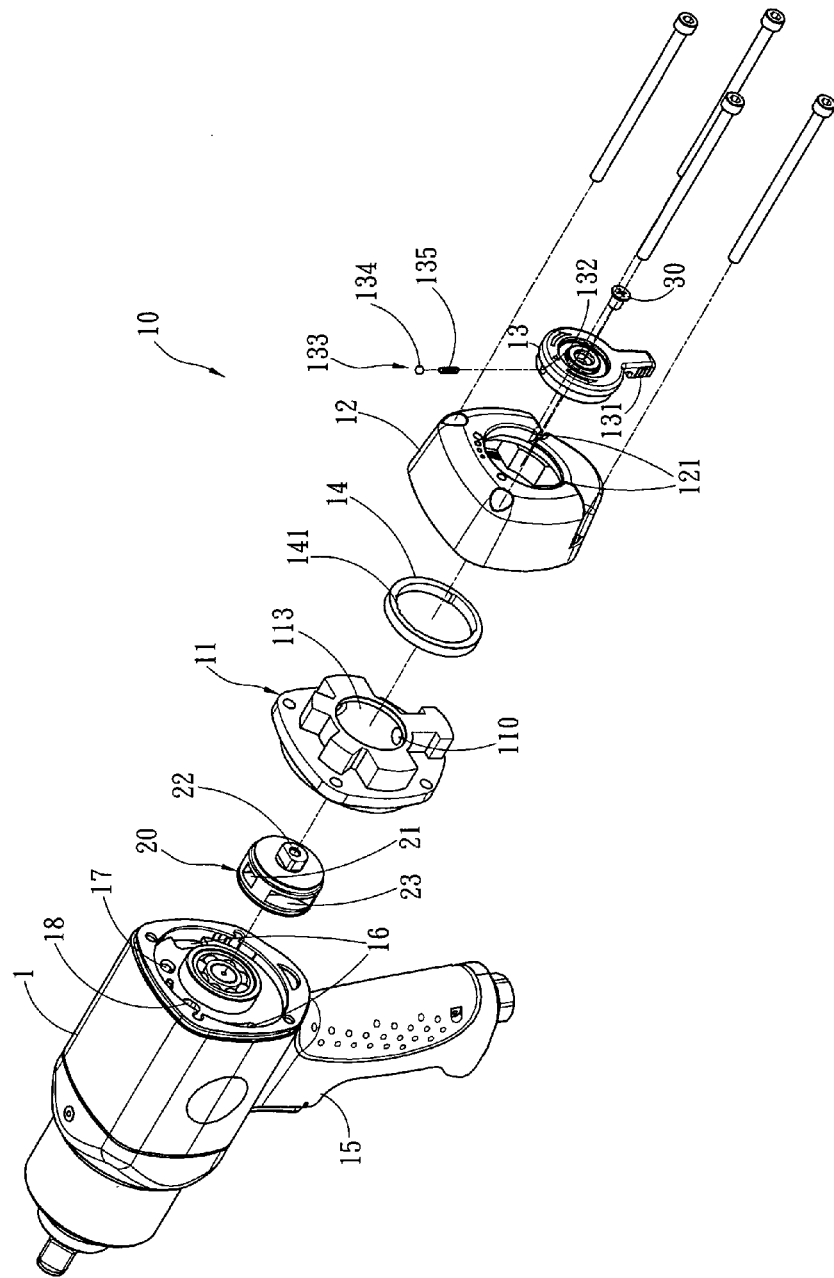
FIG. 2 is an exploded view of a structure of the present invention.

The present invention will now be described in more detail hereinafter with reference to the accompanying drawings as follows:

Referring to FIGS. 1 to 3 for the perspective view, the exploded view, and the cross-sectional view of the present invention, a clockwise or counterclockwise rotation control device of a pneumatic tool in accordance with the invention is installed at the rear end of a pneumatic tool, such that the pressurized air passes through and drives a pneumatic motor module of the pneumatic tool to move, so as to achieve the control of the pneumatic tool to produce a clockwise or counterclockwise rotation by changing the position of the pneumatic motor module. The pneumatic tool comprises a main body 1, a holding portion 15 coupled to the bottom of the main body 1, and a pneumatic motor module (not shown in the figure) installed in the main body 1. After the pressurized air passes through the clockwise or counterclockwise rotation control device in the pneumatic motor module, the pneumatic tool is driven to produce a clockwise rotation or a counterclockwise rotation. The clockwise or counterclockwise rotation control device is installed in a rear cover module 10 disposed at the rear end of the main body 1, and the clockwise or counterclockwise rotation control device comprises a cover 12 and an air guide base 11 disposed on the cover 12 and at an end corresponding to the main body 1 and having a containing space 113. The containing space 113 is interconnected to an air incoming passage (not shown in the figure) by a connecting air hole 110 for passing the pressurized air, and the air guide base 11 includes two clockwise or counterclockwise airflow passages 111, 112 respectively interconnected to the pneumatic motor module and the containing space 113, wherein the two airflow passages 111, 112 are interconnected directly to the two clockwise and counterclockwise rotating air inlets 17, 18 disposed on the pneumatic motor module for defining a clockwise rotating state and a counterclockwise rotating state for the pneumatic motor module.

The containing space 113 is provided for installing a control valve 20 for controlling and adjusting the flowing direction of the pressurized air. The control valve 20 has a valve passage 21 interconnected to the air incoming passage, such that the pressurized air is passed from the valve passage 21 through the clockwise or counterclockwise airflow passages 111, 112 to define a clockwise rotating state and a counterclockwise rotating state of the pneumatic motor module by selectively coupling the valve passage 21 with one of the air inlets 17, 18. A protruding member 22 is protruded and coupled to the control valve 20, and a turning member 13 is disposed at an outer end of the rear cover module 10 for adjusting the position of the valve passage 21 of the control valve 20. The turning member 13 is secured with the protruding member 22 by a locking member 30, such that the control valve 20 and the turning member 13 define a link relation, which installs the control valve 20 into the rear cover module 10. Further, a positioning ring 14 is installed between the air guide base 11 and the cover 12 for fixing the position of the turning member 13. The positioning ring 14 includes a plurality of positioning slots 141, and the turning member 13 includes a latching member 133 corresponding to the positioning slot 141, and the latching member 133 comprising a resilient element 135 and a steel ball 134 is installed in an accommodating hole 132 disposed at an appropriate position of the turning member 13 corresponding to the positioning slot 141, such that the steel ball 134 is propped by the resilient element 135 and latched into the positioning slot 141. Therefore, the turning member 13 can be adjusted to change the position of the valve passage 21 of the control valve 20. When the valve passage 21 is connected selectively to the corresponding clockwise airflow passage 111 and the counterclockwise airflow passage 112, the pressurized air enters from the corresponding air inlets 17, 18 into the clockwise or counterclockwise airflow passages 111, 112, and thus the pneumatic motor module produces a clockwise rotating state or a counterclockwise rotating state.

Figure 4A:
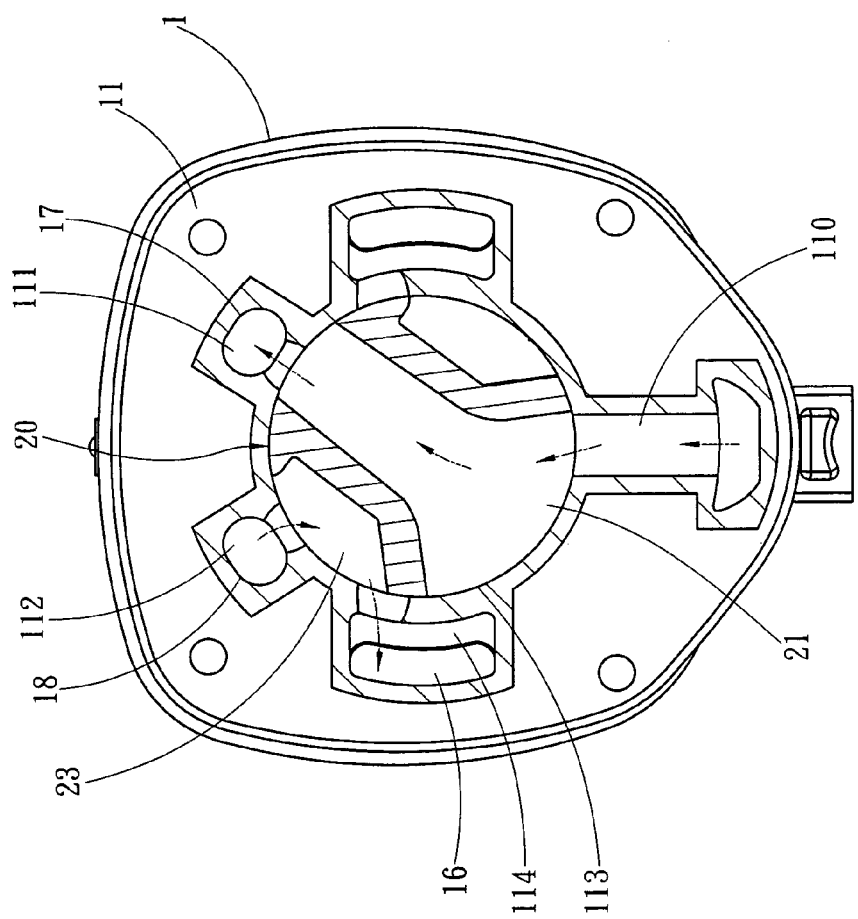
FIGS. 4A and 4B are schematic views of the movements and the flowing direction of pressurized air of the present invention.
Figure 4B:
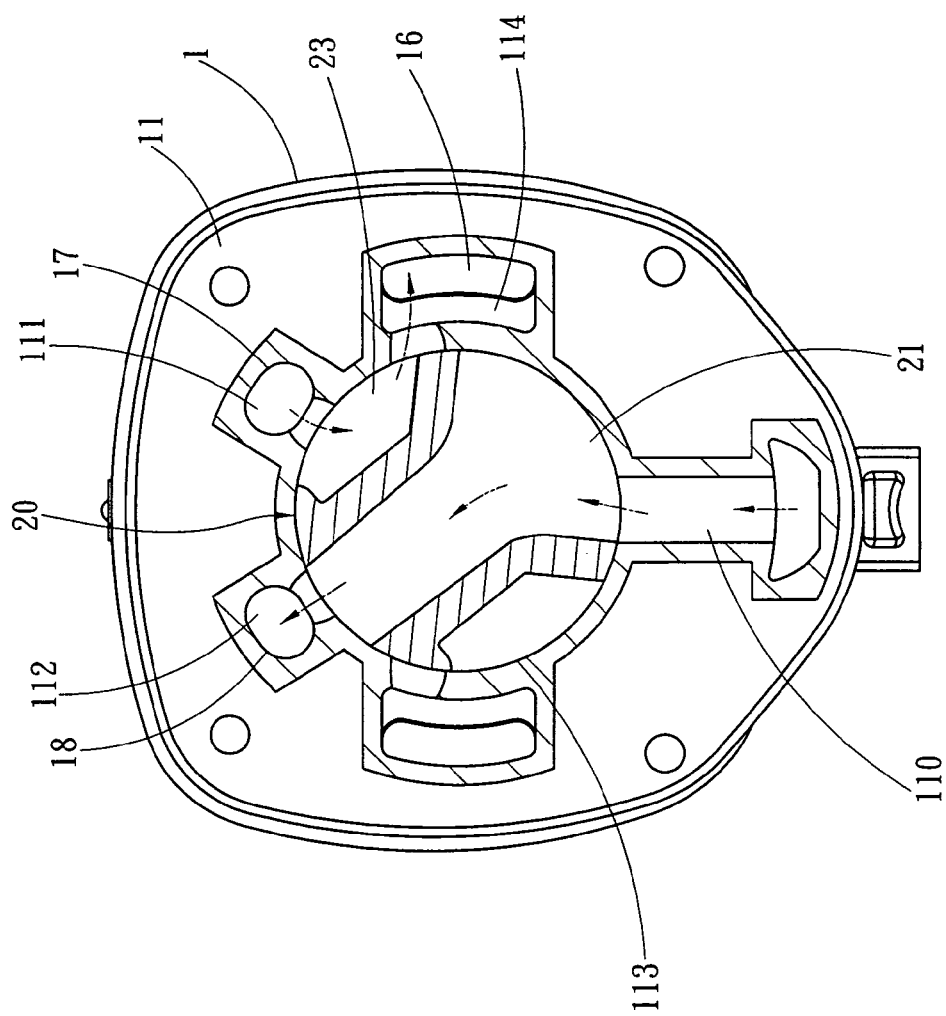

Referring to FIGS. 4A and 4B for the schematic views of the movements and flowing direction of the pressurized air, the air guide base 11 is interconnected to the air incoming passage by the connecting air hole 110, and thus the pressurized air enters into the valve passage 21 of the control valve 20, wherein the containing space 113 matches precisely with the control valve 20, and the control valve 20 can adjust the position of the valve passage 21 in the containing space 113 as shown in FIG. 4A. The pressurized air enters into an airtight space enclosed by the valve passage 21 and is guided from the clockwise rotation air inlet 17 into the pneumatic motor module through the clockwise rotation airflow passage to define a clockwise rotating state. After the pressurized air is passed to drive the pneumatic motor module, a remaining air affecting the working efficiency of the pneumatic motor module will be produced. Therefore, the air guide base 11 and the pneumatic motor module respectively include two exhaust outlets 114 and two remaining air discharge outlets 16 for removing the remaining air. The control valve 20 further includes two exhaust passages 23 separately interconnected to one of the clockwise or counterclockwise airflow passages 111, 112 and the exhaust outlet 114 in a clockwise or counterclockwise rotating state. In the clockwise rotating state as shown in FIG. 4A, the remaining air is discharged from the counterclockwise airflow passage 112 through the exhaust passage 23 and out of the interconnected exhaust outlet 114 and the remaining air discharge outlet 16.

Similarly, the principle of the counterclockwise rotating state as shown in FIG. 4B is the same as shown in FIG. 4A, the turning member 13 is adjusted to connect the valve passage 21 to the counterclockwise airflow passage 112, so that the pressurized air enters into the counterclockwise rotating air inlet 18 from the counterclockwise airflow passage 112 to drive the pneumatic motor module to form a counterclockwise rotating state. The remaining air is discharged from the clockwise rotating air inlet 17 into the interconnected clockwise airflow passage 111. By the clockwise airflow passage 111 interconnected to the exhaust passage 23 and the exhaust outlet 114, the remaining air is discharged.

Referring to FIG. 1, a section of a manual adjusting end 131 is extended from the turning member 13 to facilitate users to adjust the control valve 20 to a corresponding correct position, and two pressing ends 121 are disposed on the cover 12 and corresponding to the clockwise or counterclockwise airflow passages 111, 112, such that when the manual adjusting end 131 presses one of the two pressing ends 121, the valve passage 21 is aligned precisely at the coupled clockwise or counterclockwise airflow passages 111, 112 to maximize the airflow of the pressurized air that enters into the pneumatic motor module. Users also can adjust the turning member 13 to fix the steel ball 134 into a different positioning slot 141 on the positioning ring 14 and allow the valve passage 21 and one of the clockwise and counterclockwise airflow passages 111, 112 to have corresponding openings with different sizes, so as to adjust the airflow of the pressurized air that enters into the airflow passages 111, 112. With such arrangement, users can know about the moving status of the pneumatic tool by the position of the manual adjusting end 131.

The present invention is characterized in that the pressurized air directly enters from the valve passage 21 into the clockwise or counterclockwise airflow passages 111, 112 of the air guide base 11 and is guided into the pneumatic motor module to define a clockwise rotating state and a counterclockwise rotating state of the pneumatic motor module. Therefore, the present invention reduces the number of component modules and directly connects the clockwise or counterclockwise airflow passages 111, 112 interconnected to the pneumatic motor module to define a clockwise or counterclockwise rotating state. Obviously, the controlled pressurized air enters directly into the pneumatic motor module to define a clockwise or counterclockwise rotating state, and thus the pneumatic tool of the present invention can greatly reduce the chance of leaking the pressure of the pressurized air, and can improve the horsepower output effect of the pneumatic tool.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A clockwise or counterclockwise rotation control device of a pneumatic tool, installed to a pneumatic tool that uses a pressurized air to drive the operation of a tool and control said tool to produce a clockwise rotation or a counterclockwise rotation, and said pneumatic tool includes a main body, a holding portion coupled to the bottom of said main body, and a pneumatic motor module installed on said main body, and said pressurized air passes through an air incoming passage and enters into said pneumatic motor module to drive said tool to rotate synchronously, and said clockwise or counterclockwise rotation control device comprises:

two clockwise or counterclockwise air inlets, disposed on said pneumatic motor module for defining a clockwise rotating state and a counterclockwise rotating state;

a rear cover module, disposed on said main body and having an air guide base, and said air guide base includes a containing space interconnected to said air incoming passage and said clockwise or counterclockwise air inlets; and a control valve, installed in said containing space for controlling the flowing direction of said pressurized air and including a valve passage for passing said pressurized air, and the position of said control valve is adjusted to drive said pressurized air to pass through said valve passage to drive said pneumatic motor module for defining a clockwise rotating state and a counterclockwise rotating state.

2. The clockwise or counterclockwise rotation control device of a pneumatic tool of claim 1, wherein said air guide base and said main body separately includes two exhaust outlets and two remaining air discharge outlets respectively interconnected with each other, and said control valve includes two exhaust passages for respectively interconnecting said clockwise or counterclockwise airflow passages under said corresponding clockwise or counterclockwise rotating state.

3. The clockwise or counterclockwise rotation control device of a pneumatic tool of claim 1, wherein said rear cover module includes a turning member for defining the position of said control valve.

4. The clockwise or counterclockwise rotation control device of a pneumatic tool of claim 3, further comprising a positioning ring disposed between said turning member and said air guide base for defining the position of said turning member.

* * * * *